United States Patent [19]

Dick

[11] Patent Number: 5,893,698

[45] Date of Patent: Apr. 13, 1999

[54] PORTABLE ANCHOR DEVICE

[76] Inventor: Jerry Edward Dick, 42 Ellesboro Drive, Mississauga, Ontario, Canada, L5N 1C2

[21] Appl. No.: 08/567,100

[22] Filed: Dec. 4, 1995

[51] Int. Cl.[6] .................................................. B60P 1/00
[52] U.S. Cl. .......................... 414/538; 414/537; 414/571; 14/71.1
[58] Field of Search .............................. 414/537, 538, 414/480, 571; 14/71.1

[56] References Cited

U.S. PATENT DOCUMENTS

| | | | |
|---|---|---|---|
| 2,414,447 | 1/1947 | Cargile | 414/537 X |
| 4,068,770 | 1/1978 | Boehringer | 414/537 |
| 4,715,769 | 12/1987 | Kirtley | 414/571 |
| 4,740,132 | 4/1988 | Peyre | 414/538 X |
| 5,160,236 | 11/1992 | Redding et al. | 414/537 |
| 5,183,372 | 2/1993 | Dinverno | 414/538 |
| 5,203,668 | 4/1993 | Marmur | 414/500 |
| 5,380,145 | 1/1995 | Czaplewski | 414/537 |
| 5,517,708 | 5/1996 | Baranowski | 14/71.1 |

Primary Examiner—Stephen T. Gordon

[57] ABSTRACT

A portable anchor device for resisting the reaction forces associated with conveyance of a load between horizontal surfaces with different elevations includes at least one beam member with at least one support member pivotably attached at its upper end. The pivotal angle is selectively fixed so that the support member lies flat on the upper surface. A part or all of the load weight is supported on the anchor device and motive force is applied to the load by a winch secured to either the load or the anchor device. An anchor bar near the upper end of the anchor device projects above and behind the proximal edge of the upper surface. The anchor bar is pivotable to maintain collinearity between motive force and load advance. A flexible line which transmits the motive force from the winch to the load is anchored at the distal end of the anchor bar. A safety gate is disposed to prevent load descent until the flexible line is taut.

3 Claims, 2 Drawing Sheets

5,893,698

1

PORTABLE ANCHOR DEVICE

BACKGROUND OF THE INVENTION

1. Filed of the Invention

The present invention related to a simple, portable anchor device for providing an anchor point to resist the reaction forces associated with conveying a load between two substantially horizontal surfaces with different elevations. More specifically, the invention relates to a portable anchor device which provides an anchor point above and behind the proximal edge of the upper surface.

2. Description of the Prior Art

The conveyance of loads between lower and upper horizontal surfaces includes lifting loads on and off vehicles or moving them up and down stairs. Such transport can often be facilitated by a means with mechanical advantage such as a winch with a flexible line. However, application of such means requires an immovable anchor point to resist the reaction forces associated with the action of the motive force on the load. Furthermore, it is preferable that the anchor point be located above and behind the proximal edge of the upper horizontal surface.

This requirement is exemplified in U.S. Pat. No. 5,183,372 dated Feb. 2, 1993, granted to Dinverno for "Van-Mounted Service Carts for Skilled Tradesmen", in which a winch means is anchored within a motor vehicle and is used to winch a service cart across a ramp means between the ground and the vehicle bed. While such anchor points can be created in a specific location by means such as clamping, welding or bolting, there are many locations where such affixation is impractical or impossible. Moreover, such anchor points are not portable and may require strength assessment of the structural base for the anchor point in each application.

Another common requirement of the approach suggested by the aforesaid patent is that the ramp means must be secured to resist the forces produced by load traversal across the ramp. Again, solutions such as clamping or bolting preclude simple and broad application.

A useful aspect for reducing the motive force requirement for load conveyance is maintenance of collinearity between the motive force and load advance throughout the transport process. In U.S. Pat. No. 5,203,668 dated Apr. 20, 1993, granted to Marmur for an "Apparatus for Loading and Unloading of a Container Structure or Other Loads with Respect to a Truck Body or Trailer", this aspect is partially achieved by a pivotable upper frame which can apply motive force in a combined upward and forward direction somewhat collinear with load advance. However, the collinearity is imperfect and the upper frame is not portable.

Finally, if a flexible line used to apply motive force to a load on a ramp or incline is not taut when the load begins descent, unrestrained load advance may cause damage or injury.

Accordingly, it is an object of the present invention to provide an anchor point to resist the reaction forces associated with conveyance of a load between horizontal surfaces with different elevations, in a device which is portable and does not require affixation to the surfaces or structures between which the load is conveyed. Furthermore, in a preferred embodiment, a ramp means and more specifically, a ramp means secured to resist the forces of load traversal is not required.

Another object of the present invention is that the anchor point be located above and behind the proximal edge of the upper horizontal surface. The invention may also permit application of motive force which is substantially collinear with load advance until the load is supported on a horizontal surface. A further object of the invention is that it will prevent load descent until a flexible line controlling load advance is taut.

SUMMARY OF THE INVENTION

Briefly described, the portable anchor device of the present invention includes at least one beam member which is preferable extensible and has upper and lower ends. At least one support member is pivotable attached to the upper end of the beam member. The pivotal angle of the support member is selectively fixed by an angle setting mechanism.

The portable anchor device of the present invention bears part or all of the weight of a load which is being conveyed, and the motive force is applied by a means with mechanical advantage which is secured to either the load conveyed or the portable anchor device itself.

An anchor point is located on any portion of the portable anchor device which is above and behind the proximal edge of an upper substantially horizontal surface. The anchor point is immovable against the reaction forces associated with conveyance of the load between horizontal surfaces with different elevations. In a preferred embodiment, the anchor point may be located at the distal end of an anchor bar means which projects above and behind the proximal edge of the upper horizontal surface. The anchor bar means may also be pivotably attached so that the application of motive force on the load remains substantially collinear with load advance.

It is also preferred that a safety gate means be attached near the support member and be disposed to prevent descent of the load until a flexible line member which applies motive force to the load is taut. Release of the safety gate means to permit load descent is accomplished by the reaction forces accompanying load conveyance.

These and other objects and advantages of the invention will be readily apparent to one familiar with the difficulties of conveying heavy loads between different elevations in diverse locations particularly upon reading the following detailed description and inspecting the accompanying drawings.

BRIEF DESCRIPTION OF THE DRAWINGS

The invention, as exemplified by a preferred embodiment, is described with reference to the drawings in which.

DETAILED DESCRIPTION OF THE INVENTION

Figure 1:
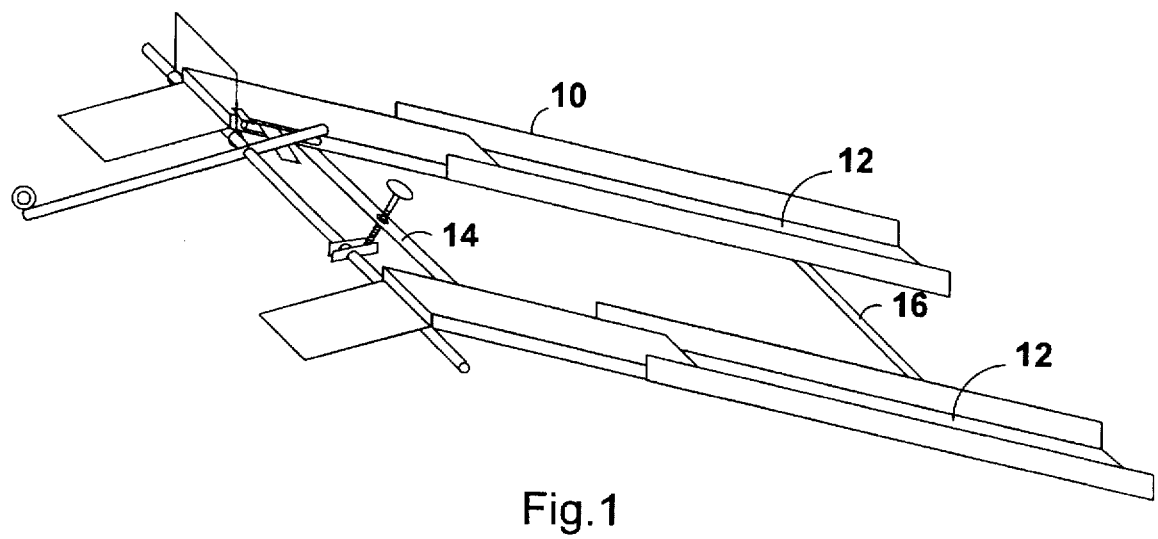
FIG. 1 is a perspective view of the preferred embodiment of the invention.

With reference to the drawings wherein identical or corresponding parts are identified by the same reference numeral, FIG. 1 shows a portable anchor device at 10, which includes two generally parallel and extensible beam members 12, connected by an upper lateral member 14 and a lower lateral member 16.

Figure 2:
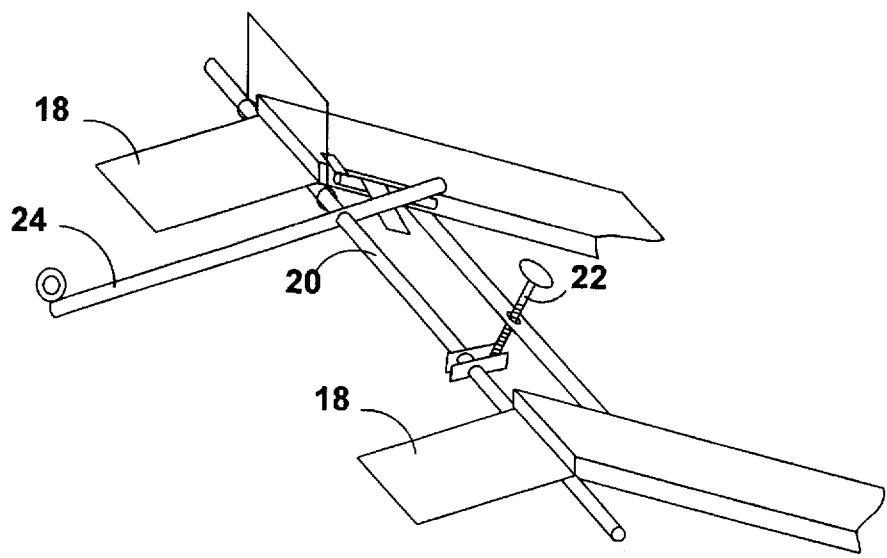
FIG. 2 is an enlarged and fragmentary perspective view of the upper portion of the embodiment of FIG. 1.

Referring now to FIG. 2, two support members 18 rest on a substantially horizontal upper surface and are pivotably attached to the upper ends of the extensible beam members by a joint rod 20. The pivotable angle between the beam members and the support members is selectively fixed by an angle setting mechanism 22 so that the support members lie flat on the horizontal surface.

An anchor bar means 24 is pivotably mounted on the joint rod 20. The distal end of the anchor bar means extends above and behind the proximal edge of the upper surface.

Figure 3:
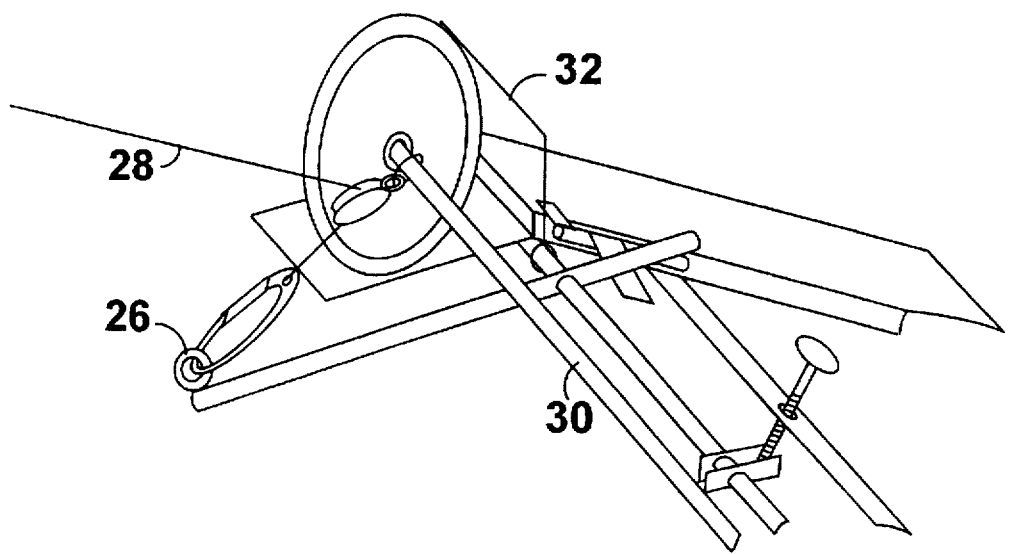
FIG. 3 is an enlarged and fragmentary perspective view of the upper half portion of the embodiment of FIG. 1 with typical load attachment.

Referring now to FIG. 3, an eyebolt 26 at the distal end of the anchor bar means provides an anchor point for a flexible line 28 which transfers motive force to a load 30. In the absence of reaction forces, the anchor bar means lies flat on the horizontal surface so as not to obstruct load passage. However, load advance is still precluded by safety gate means 32.

Figure 4:
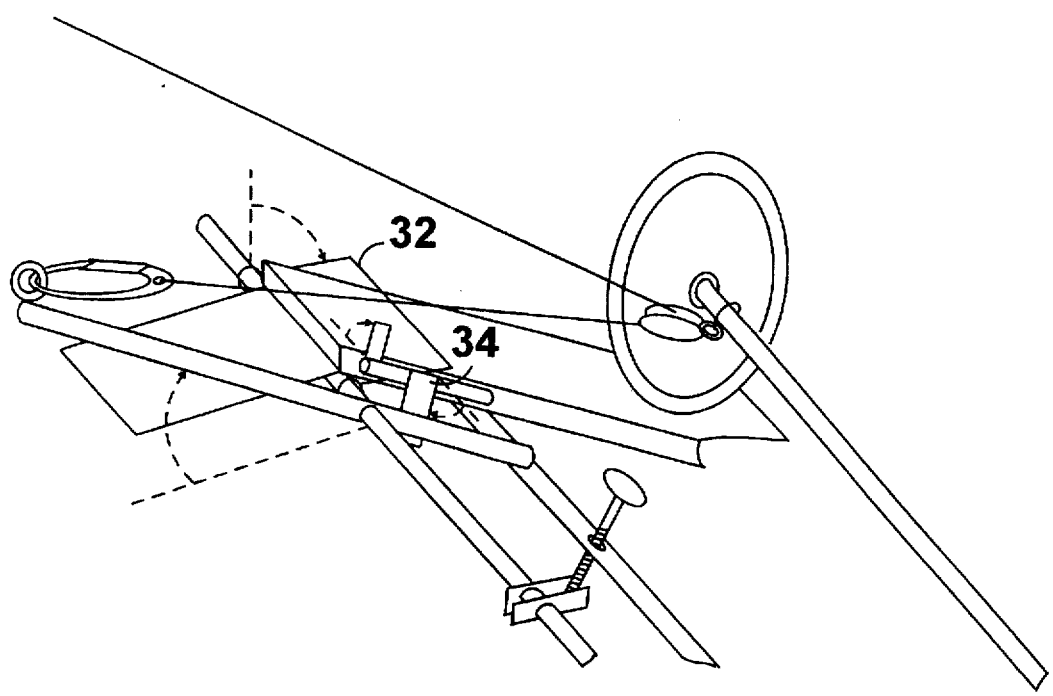
FIG. 4 is an enlarged and fragmentary perspective view of the upper half portion of the embodiment of FIG. 1 showing the anchor bar means in its raised position during load descent or ascent.

FIG. 4 illustrates that when the flexible line is drawn taut by operation of a winch means (not shown, but secured to either the load or the portable anchor device), the anchor bar means rotates to an orientation which is collinear with the direction of load advance. Such rotation precedes both ascent and descent processes. Collinear motive force can thus be applied to the load for all positions in which the load is not supported on either upper or lower horizontal surfaces.

The rotation of the anchor bar means contacts lever 34 on a latch mechanism for the safety gate means 32. Rotation of the latch mechanism releases the safety gate means, which rotates so as to permit load advance.

When the load is motionless or moving at constant velocity, the winch means, the load and the portable anchor device together comprise a body system in static equilibrium and therefore there are no fundamental components of horizontal force to induce disengagement of the anchor device from the horizontal surfaces. However, detailed design should include consideration of provisions to limit or accommodate load decelerations, excessive support of the beam member on the inclined portion of stairs or ramps, inordinate rotation of the support member so that it is not flat on the horizontal surface, and transfer of reaction forces to the anchor device while the centre of gravity of the load acts outside of the extremities of the anchor device.

All of the components of the anchor device including the structural members can be fabricated from a variety of materials including plastics, metals such as aluminum and steel, and wood.

Although only a single embodiment of the present invention has been described and illustrated, the present invention is not limited to the features of this embodiment, but includes all variations and modifications within the scope of the claims.

The embodiments of the invention in which an exclusive property or privilege is claimed are defined as follows:

1. An anchor device which does not require affixation to structures between which a load is conveyed comprising:

at least one beam member having upper and lower ends;

at least one support means for resting flat on a surface and providing support for said load throughout conveyance of said load;

each said support means pivotally attached to the upper end of said beam member;

an angle setting means to selectively fix the pivotal angle of each said support means;

an anchor point means located on any portion of said anchor device which is above and behind the proximal edge of said surface, to resist the reaction forces associated with conveyance of said load.

2. The anchor device of claim 1 wherein said anchor point means is located at the distal end of an anchor bar means which projects above and behind the proximal edge of said surface;

said anchor bar means is pivotally attached to any portion of said anchor device so that the application of motive force on said load remains collinear with a load advance;

said anchor bar means is a separate pivotable element from said support means.

3. The anchor device of claim 1 wherein a safety gate means is provided for preventing descent of said load until a flexible line controlling the advance of said load is taut.

* * * * *